Aug. 16, 1938.  F. G. SCHWEISTHAL ET AL  2,127,272
TESTING AND CALIBRATING MACHINE
Filed Nov. 23, 1936   3 Sheets-Sheet 2
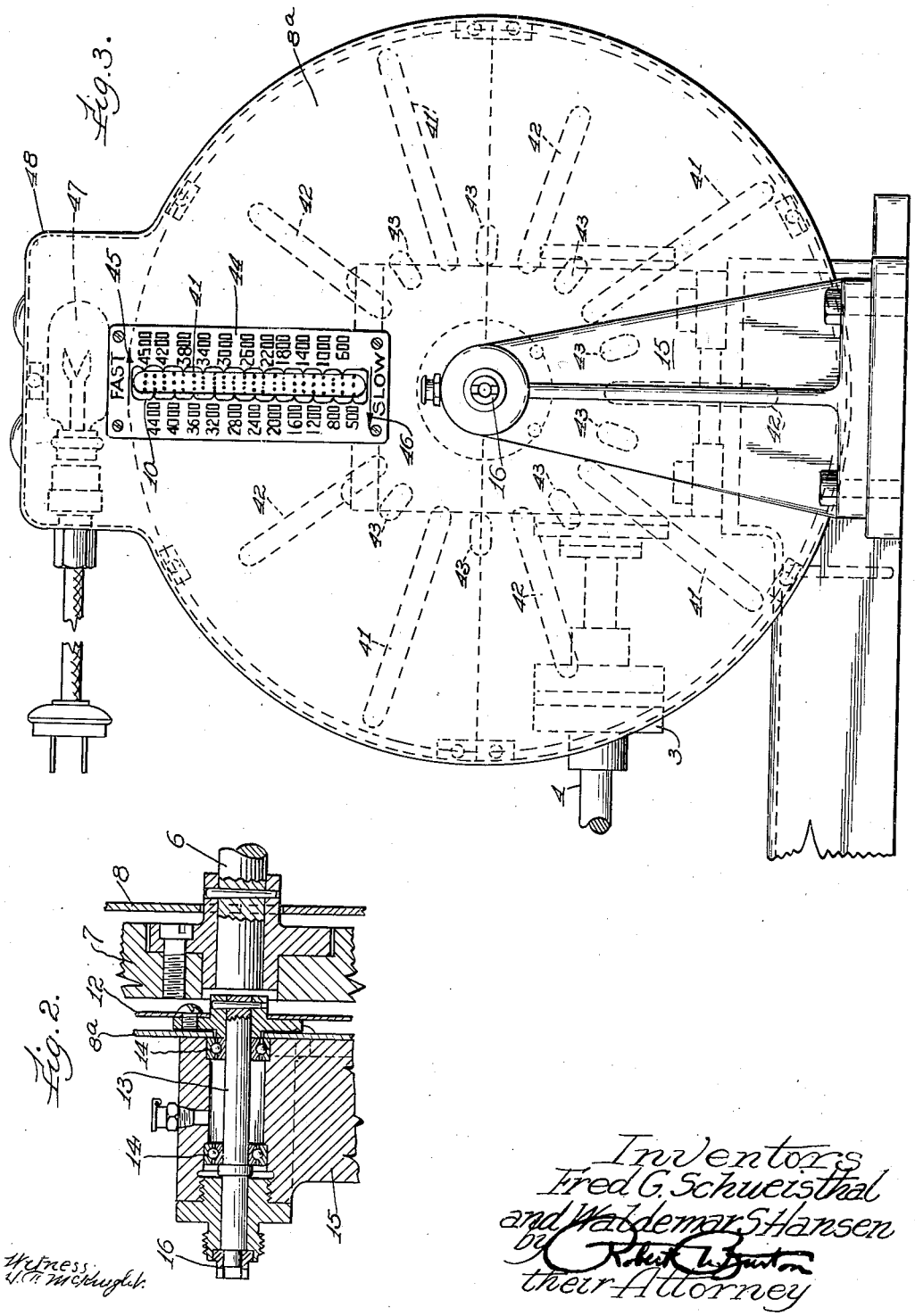

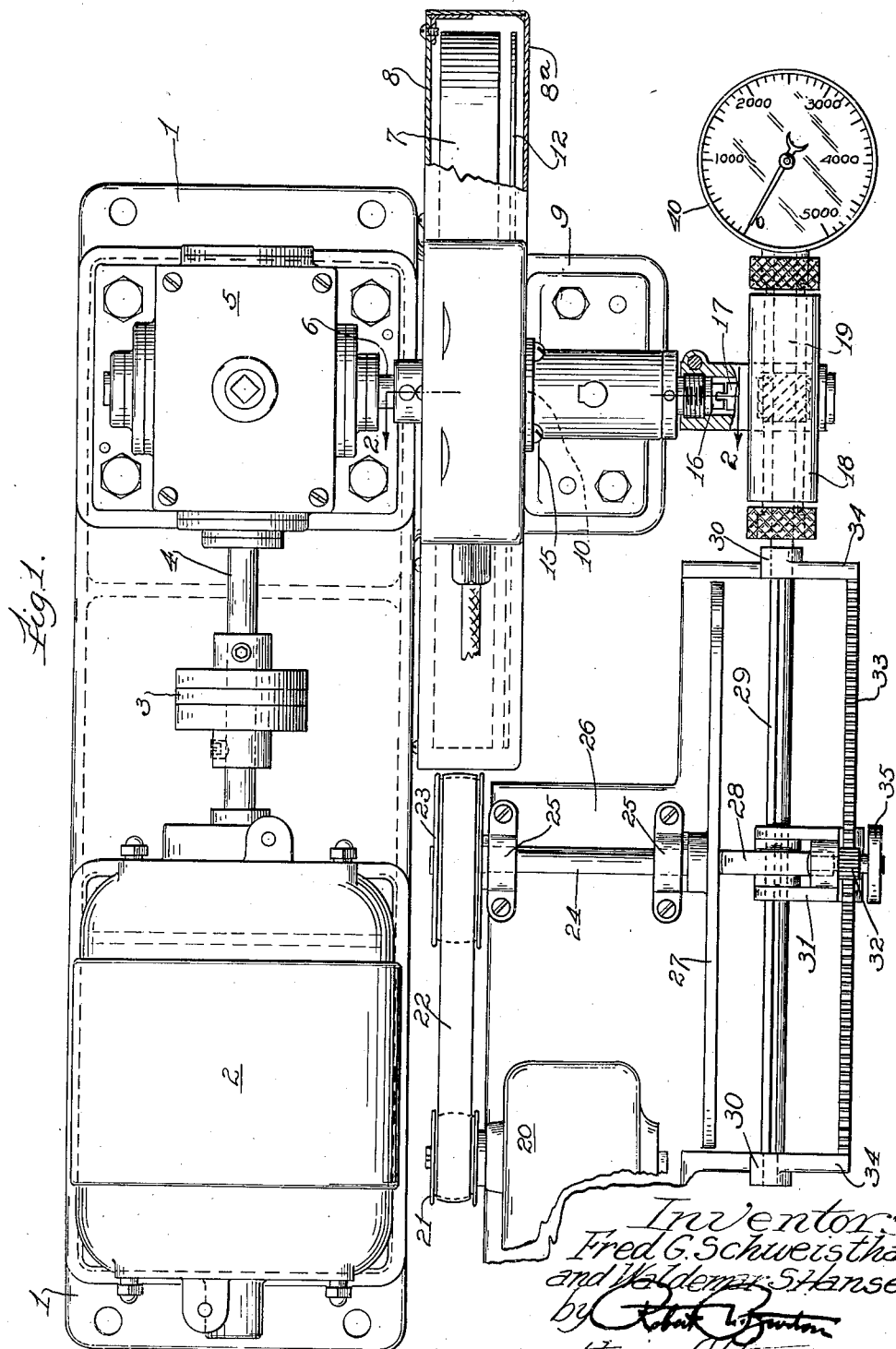

Aug. 16, 1938.  F. G. SCHWEISTHAL ET AL  2,127,272
TESTING AND CALIBRATING MACHINE
Filed Nov. 23, 1936  3 Sheets-Sheet 3
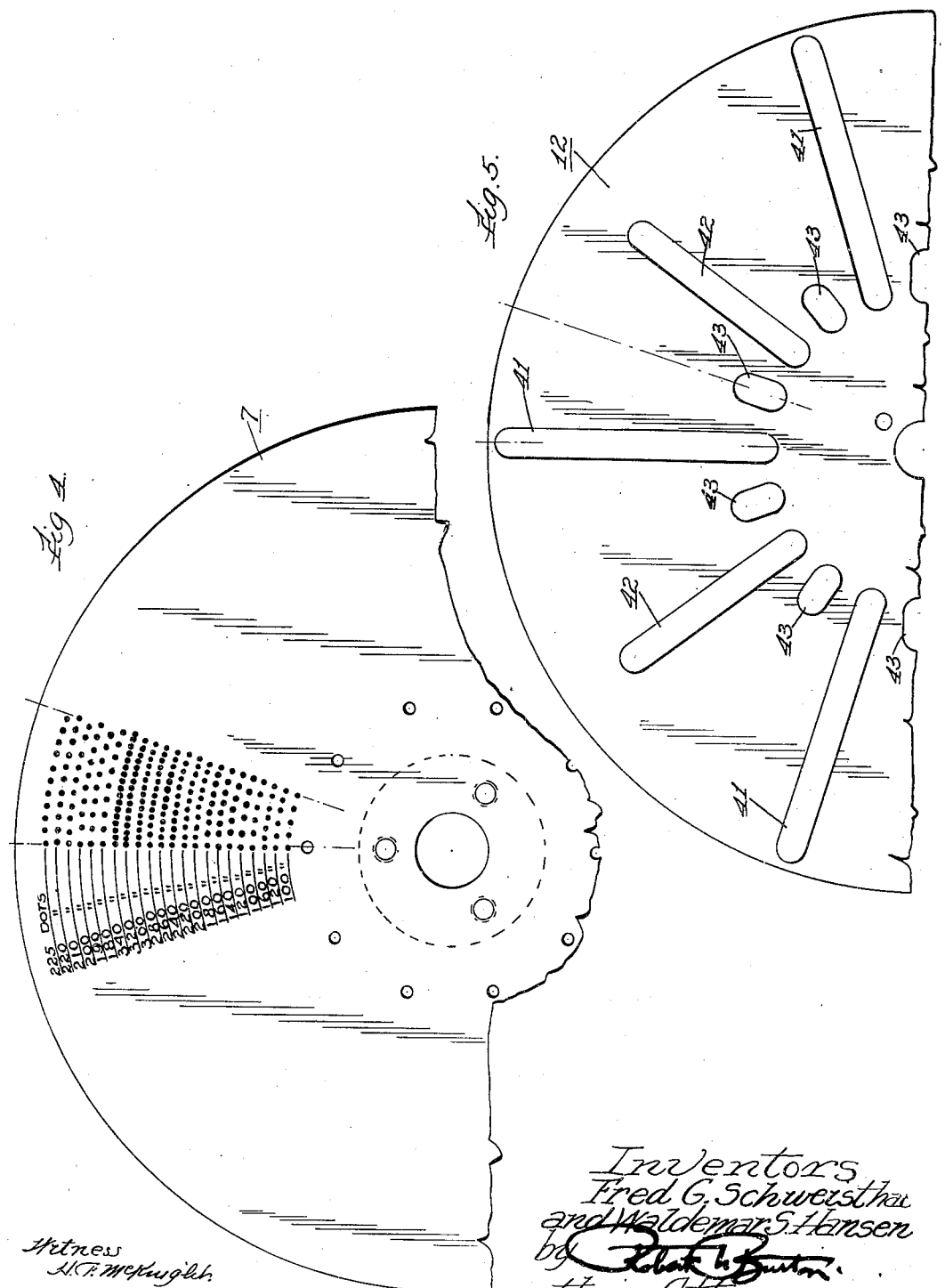

Patented Aug. 16, 1938

2,127,272

UNITED STATES PATENT OFFICE 2,127,272

TESTING AND CALIBRATING MACHINE

Fred G. Schweisthal and Waldemar S. Hansen, Chicago, Ill., assignors to Stewart-Warner Corporation, Chicago, Ill., a corporation of Virginia Application November 23, 1936, Serial No. 112,249

10 Claims. (Cl. 88—14)

This invention relates to an apparatus designed for checking and calibrating speed-indicating instruments, such as tachometers and speedometers. One object of the invention is to provide a relatively light and portable mechanism for this purpose. And another object is to provide an apparatus operating on the principle of the stroboscope and adapted for checking the performance of an instrument throughout its entire range and at a considerable number of speeds within that range. A further object is to simplify the process of calibration for the operator and to permit the checking of several readings at different speeds with a minimum of readjustment. The invention consists of certain features and elements of construction in combination as herein shown and described and as indicated by the claims.

In the drawings:

Figure 1 is a plan view of an apparatus embodying the invention, showing an instrument associated therewith in position to be tested.

Figure 2 is a detail section taken as indicated at line 2—2 on Figure 1.

Figure 3 is a front elevation of the stroboscope portion of the apparatus, omitting the driving motor therefor and omitting the instrument to be tested and its driving motor.

Figure 4 is a partial front elevation of the uniform speed disk.

Figure 5 is a partial elevation of the slotted disk which cooperates therewith.

Figure 1 shows a base plate, 1, having mounted on it a motor, 2, which may be understood to be of the synchronous type adapted to run at a uniform speed and intended to be operated by a source of current having a controlled frequency to ensure uniform speed of motors fed from such current source. Electric current of this nature is now easily available in most communities where synchronous electric clocks are run from the regular lighting circuit.

The motor, 2, is connected by a coupling, 3, to a shaft, 4, which is shown entering a transmission case, 5, which may be understood as containing suitable gearing connecting the shaft, 4, with a shaft, 6, extending at right angles thereto and carrying a disk, 7, which is preferably a solid metal wheel of appreciable weight, adapted to serve as a balance wheel for further ensuring uniformity of its own speed. The transmission gearing, (not shown), in the casing, 5, may be of a speed-reducing type, so that the actual speed of rotation of the disk, 7, is considerably less than the shaft speed of the motor, 2. A convenient velocity for the disk, 7, has been found to be fifty revolutions per minute.

A housing, 8, of sheet metal or other thin material, encloses the disk, 7, this housing being supported on an extension, 9, of the base plate, 1, and having a front wall, 8a, which includes an observation slot or window, 10. Just back of the front wall, 8a, and within the housing, there is mounted a second disk, 12, which may be of relatively thin material, and which is journaled independently of the disk, 7, but coaxially therewith. Figure 2 shows a shaft, 13, for the disk, 12, journaled in bearings, 14, which are supported by a post or bracket, 15, upstanding from the base, 9. The outer end of the shaft, 13, is provided with a coupling member, 16, adapted for engagement with the shaft, 17, of a T-shaped, three-way drive coupling, 18, seen in Figure 1. It may be understood that the disk, 12, is to be revolved at various speeds corresponding to different speeds of an instrument under test, while the disk, 7, continues to revolve at its uniform speed. The disk, 12, may be driven by any convenient motive source, such as the motor shown at 20, having a pulley, 21, connected by a belt, 22, with a pulley, 23, on a shaft, 24, which is shown journaled at 25 on a separate base or mounting plate, 26. The shaft, 24, carries a friction disk, 27, for transmitting motion to a friction wheel, 28, which is slidably keyed to a shaft, 29, whose journal bearings, 30, are supported by the base, 26. For adjusting the wheel, 28, over the friction face of the disk, 27, said wheel is engaged between the arms of a yoke, 31, which is also slidable along the shaft, 29, and which carries a spur gear, 32, engaging the teeth of a rack, 33, extending parallel to the shaft, 29, and connecting the bracket arms, 34, which support the shaft bearings, 30. A hand wheel, 35, is provided for turning the gear, 32, to shift the friction wheel, 28, to any desired position of adjustment so as to vary the speed transmitted to the shaft, 29. Through the shaft, 19, of coupling, 18, the shaft, 29, is connected for simultaneously driving the instrument shown at 40, which is to be tested, and the stub shaft, 17, coupled to the shaft, 13, for turning the disk, 12. It may be understood that the coupling, 18, includes any suitable spiral or other gears for connecting its shaft, 19, with its shaft, 17, and that, ordinarily, these two shafts will be operated at equal speeds. Thus the speed of revolution of the disk, 12, will correspond to the speed at which the instrument, 40, is operated, and these speeds may be varied at will through a wide range by adjusting the friction wheel, 28, over its driving disk, 27, as described.

On the face of the disk or wheel, 7, there are painted or imprinted a series of concentric circles of dots or similar characters. The dots in each circle are uniformly spaced apart but differ in number and spacing from those in the other circles. Figure 4 shows a few dots of each circle as contained in a limited segment of the face of the wheel, 7, but it may be understood that each circular row is continuous and endless, and that the drawings are marked to indicate by way of example the number of dots which may be included in each circle, but that these numerical indications are merely added to the drawings by way of explanation and are not actually displayed on the disk itself. The disk, 12, is formed with radial slots, and, as shown, there are five slots, 41, which extend radially over all the zones occupied by the dots on the wheel, 7. A second series of shorter slots, 42, also five in number, is arranged to alternate with the slots, 41, and a third series of still shorter slots, 43, is disposed so that one of the short slots, 43, occurs midway between each of the slots, 41, and the adjacent slot, 42. In other words, near the center of the disk, 12, there are twenty slots at equal arcuate intervals; beyond the short slots, 43, there is a series of ten slots equally spaced apart, and near the periphery of the disk, 12, the extending end portions of the slots, 41, make up a series of five slots at intervals of 72 degrees in the particular structure shown. The window, 10, in the front face, 8a, of the casing is substantially the same length and width as one of the slots, 41, and extends radially with respect to the axis of rotation of the disks, 7 and 12, so that as the disk, 12, rotates its slots will coincide with the window, 10, and for an instant the dots on the face of the disk, 7, will be visible through the window, 10, and the coinciding slot of the disk, 12. Associated with the window, 10, is a slotted dial plate, 44, bearing index marks aligned with the several concentric circles of dots on the disk, 7, and bearing a numerical designation opposite each of said index marks. At its upper and lower ends respectively the dial plate also carries directional arrows, 45 and 46, with which are associated the words "Fast" and "Slow" respectively, for a purpose about to be explained. To facilitate observation of the dots on the disk, 7, as the disk revolves, they are preferably displayed in black on a white background, and the front face of the slotted disk, 12, is finished in black, while its rear face is finished white. If desired, an electric lamp bulb, indicated at 47, may be mounted in a hood, 48, formed as a part of the housing, 8, so as to furnish illumination for the face of the disk, 7.

The several concentric rows of dots on the disk, 7, vary in number, and the number in each row is calculated so that when the disk, 12, is rotated at a particular speed, a certain row of the dots on the disk, 7, will appear stationary as viewed through the slots or apertures of the disk, 12, acting as a shutter, and plate, 44, acting as a fixed window opening. The row of dots which should appear stationary at a given speed is indicated by the speed designation associated with the index marks adjacent the window, 10, in the wall or cover, 8a. However, if it is found that when the reading of the instrument, 40, corresponds to one of the numerical designations on the plate, 44, the circular row of dots aligned with that particular designation does not appear strictly stationary but seems to shift either to the right or to the left, this effect will be understood as indicating that the reading of the instrument is either faster or slower than the actual speed which it is intended to register. The following table may be furnished with the machine to assist in the intepretation of its readings:

| Indicated revolutions per minute | Number of dots in the circle |
| --- | --- |
| 500 | 100 |
| 600 | 120 |
| 800 | 160 |
| 1000 | 100 |
| 1200 | 120 |
| 1400 | 140 |
| 1600 | 160 |
| 1800 | 180 |
| 2000 | 200 |
| 2200 | 220 |
| 2400 | 240 |
| 2600 | 260 |
| 2800 | 280 |
| 3000 | 300 |
| 3200 | 320 |
| 3400 | 340 |
| 3600 | 180 |
| 3800 | 190 |
| 4000 | 200 |
| 4200 | 210 |
| 4400 | 220 |
| 4500 | 225 |

With the particular arrangement of dots and graduations herein illustrated the rule for utilizing the machine may be stated as follows: Multiply the number of dots passing out of view at the window 10 in one minute by the speed indicated by the instrument under test, and divide this product by fifty times the number of dots in the circle corresponding to the indicated speed (number of dots is shown in above schedule). This determines the amount of the error in R. P. M. Whether the instrument reading is fast or slow is determined by the direction in which the dots appear to pass out of view, and is indicated by the arrows marked "Fast" and "Slow" at the upper and lower ends of window 10.

The following example will illustrate the method of determining an error indicated by this machine in the process of calibrating a particular instrument:

*Example*

Find error in R. P. M. at indicated speed of 1400 R. P. M. when number of dots appearing to pass to the right of slot or window 10 is 28, as counted for one minute, using a stop watch.

Number of dots passing out of view _____ 28
True indicated speed _____ 1400
Number of dots in circle (for 1400 R. P. M.) _ 140
Constant is 50 (R. P. M. of wheel 7, carrying dots).

$$\frac{28 \times 1400}{50 \times 140} = \frac{28}{5} = 5.6$$ R. P. M. error fast (as indicated by arrow 45 pointing to the right).

In this example, therefore, the instrument being tested is found to have a speed 5.6 R. P. M. faster than its indicated speed when the reading is 1400 R. P. M. By means of several other readings taken at different speeds the degree of error throughout the range can be readily observed, and the probable cause determined and corrected.

It will be understood that for obtaining the foregoing results the wheel, 7, and the disk, 12, are both driven so as to rotate clockwise. At any of the particular speeds denoted by markings on the dial plate, 44, the corresponding row of dots on the wheel, 7, is a definite factor of the speed so that if the speed of the shutter disk, 12, and the equal or related speed of the instrument spindle are accurate in accordance with the dial readings of the instrument, a group of dots which appears momentarily to the eye as a slot of the shutter wheel, 12, passes the window, 10, and is replaced by another group of dots in exactly the same position as the next slot of the wheel passes the window; this causes the dots to appear stationary. But if the shutter disk and the instrument are running slightly faster than the speed indicated on the instrument dial, the uniformly traveling dots on the wheel, 7, will fail to replace each other on time as the slots of the disk register with the window, 10. This slight lag in the arrival of the replacement group of dots will cause the dots to appear to be shifting to the left of the window, 10. Similarly, if the instrument speed and that of the disk, 12, is lower than the instrument dial reading, the corresponding row of dots on the wheel, 7, will appear to shift gradually to the right, denoting that the instrument reading is "fast", or higher than it should be for the actual speed. By taking a series of readings at different speeds the observer can usually determine the cause of the inaccuracy of the particular instrument under test, and arrange for its correction either by noting a correction factor to be applied to the readings or by some readjustment in the working parts, depending upon the particular construction involved.

It will be evident that by a simple re-arrangement of the mechanism the disk, 7, bearing the several rows of spaced dots, may be connected to be driven at various speeds in a fixed relation to the speed of the instrument being tested, while the shutter disk, 12, is rotated at a uniform speed. The invention is, therefore, not strictly confined to the arrangement illustrated in the drawings, but embraces either construction by which one of the disks is driven at a uniform speed, while the other disk is driven at a fixed ratio to the variable speed of the instrument under test.

While there is shown and described herein certain specific structure embodying the invention, it will be manifest to those skilled in the art that various modifications and re-arrangements of the parts may be made without departing from the spirit and scope of the invention, and that the same is not limited to the particular form herein shown and described, except in so far as indicated by the appended claims.

We claim:

1. The combination of a rotary member, a motor for rotating it at a uniform speed, a rotary shutter mounted adjacent said member, the surface of said member toward the shutter bearing a plurality of adjacent and continuous co-axially arranged rows of marks, and the shutter having a plurality of uniformly spaced apertures each dimensioned to expose several adjacent rows of marks simultaneously, a speed-indicating instrument to be tested having a drive shaft, driving means including speed-varying means adjustable at will and connected for simultaneously rotating said shutter and the shaft of the instrument at speeds always in a fixed ratio with respect to each other, the respective rows of marks differing in number and each row of marks corresponding to a different instrument speed, the speed of the shutter and instrument being variable through a range of speeds to which the several rows of marks correspond, the number of marks in each row being calculated so that at the exact speed corresponding to that row said marks, when successively viewed through the shutter apertures, will appear stationary.

2. In the combination defined in claim 1, a sight element positioned for viewing the marks through the shutter apertures, a graduated scale of speed designations associated with the sight element and located for identifying the respective rows of marks which correspond to various speeds at which the instrument is to be tested.

3. In the combination defined in claim 1, a sight element positioned for viewing the marks through the shutter apertures, said sight element having directional designations associated with it and indicating the apparent direction of movement of any row of marks as viewed at said element when the instrument speed is respectively greater or less than that indicated by the instrument.

4. The combination of a rotary field member, a rotary shutter member mounted adjacent thereto, the surface of said field member toward the shutter bearing a plurality of adjacent and continuous co-axially arranged rows of marks, and the shutter having a plurality of uniformly spaced apertures each dimensioned to expose several adjacent rows of marks simultaneously, means for driving one of said rotary members at a known uniform speed, a speed-indicating instrument having a drive shaft, means for simultaneously driving the other rotary member and the shaft of the instrument at speeds always in a fixed ratio with respect to each other, the respective rows of markings differing in number and each row of marks corresponding to a different speed, and means adjustable at will for varying the speed of said driving means and thereby varying the speed of said other rotary member and the instrument shaft through a range of speeds to which the several rows of marks correspond, the number of marks in each row being calculated so that at the speed corresponding to that row said marks, when successively viewed through the shutter apertures, will appear stationary.

5. The combination of a wheel, means to rotate it about its axis at a uniform speed, a disk mounted for rotation about the same axis in a plane adjacent the face of the wheel, said wheel having a plurality of concentric rows of marks on its face, and the disk having a plurality of uniformly spaced radial slots each dimensioned to expose several adjacent rows of marks simultaneously, a cover member overlying the face of the disk having an observation window with which said slots register as the disk is rotated, means for rotating the disk, and a variable speed drive connection for simultaneously rotating said disk and the drive spindle of a speed-indicating instrument in constant speed relation to each other, the respective rows of marks differing in number and each row of marks corresponding to a different instrument speed, the number of marks in each row being calculated so that at the speed corresponding to that row said marks, when successively viewed through the shutter apertures, will appear stationary, said instrument being mounted adjacent the said observation window in a position for conveniently reading the instrument while observing the marks through said window.

6. The combination of a rotary member, a constant speed motor for driving it at a known uniform speed, a rotary shutter disk mounted adjacent said member, the member having a plurality of concentric rows of uniformly spaced marks, and the shutter having a plurality of uniformly spaced radial slots each dimensioned to traverse a plurality of rows of marks, a separate driving member for rotating said shutter, and means for varying the speed of rotation of the shutter at will, together with coupling means for driving the spindle of a speed-indicating instrument simultaneously in constant speed relation with the shutter disk, and a cover extending over the face of the disk having a sight window in the form of a slot adapted to register with the slots of the disk as the latter rotates, and having speed designations disposed along the slot of the cover and aligned with the respective rows of marks which are momentarily exposed by the shutter, the several rows of marks differing in the number of marks which each contains, and each row of marks corresponding to a different instrument speed, the number of marks in each row being calculated so that at the speed corresponding to that row said marks, as momentarily viewed through the shutter apertures, will appear stationary.

7. In the combination defined in claim 6, the shutter apertures through which are viewed the rows of marks corresponding to the lower speeds being more numerous and more closely spaced than the shutter apertures registering with the marks in the rows corresponding to the higher speeds.

8. In the combination defined in claim 5, the series of marks nearer the center of the wheel corresponding to the lower speeds to be observed, and the marks farther from the center corresponding to higher speeds, while the slots of the disk comprise a series of longer slots overlapping all the series of marks on the wheel and interspersed shorter slots near the center of the disk overlapping only the marks corresponding to the lower speeds.

9. A machine for testing a speed-indicating instrument comprising a rotary field member bearing on its surface a plurality of rows of marks, said rows extending adjacent each other in co-axial relation with respect to the axis of rotation of the field member, and the respective rows of marks differing in number, means connected to drive said field member at a constant speed, a fixed sight element positioned for viewing the marks, a shutter device operable to expose said marks momentarily at the sight element and dimensioned to expose several adjacent rows of marks simultaneously, means for operating said shutter adjustable to vary the frequency of the exposures, and driving means for the speed-indicating instrument to be tested, connected to operate simultaneously with the shutter device and in a fixed speed relation thereto throughout the range of variation of shutter speeds.

10. A machine for testing a speed-indicating instrument comprising a rotary field device including a member bearing on its surface a plurality of rows of marks, said rows extending adjacent to each other and in co-axial relation to the axis of rotation of said field device, and the respective rows of marks differing in number, a fixed sight element positioned for viewing the marks, a shutter device operable to expose the marks momentarily at said sight element, driving means connected to operate one of said devices at a constant speed, driving means connected to operate the other device and adjustable to vary the speed of operation, and a speed-indicating instrument to be tested, connected with the variable speed driving means for operation in a fixed speed relation to the device driven thereby and throughout the range of variation thereof.

FRED G. SCHWEISTHAL.
WALDEMAR S. HANSEN.